United States Patent
Goodzey et al.

(10) Patent No.: US 6,280,002 B1
(45) Date of Patent: Aug. 28, 2001

(54) HYDRAULIC BRAKING SYSTEM

(75) Inventors: Gregory Paul Goodzey, South Bend; Bryan Frances Heinz, Goshen, both of IN (US); Timothy Jay Albert, Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/493,572

(22) Filed: Jan. 28, 2000

(51) Int. Cl.$^7$ ........................................... F16D 31/02
(52) U.S. Cl. ..................... 303/3; 188/358; 303/114.1; 303/114.2; 303/2; 303/113.4; 303/10; 303/166
(58) Field of Search ................... 303/2, 3, 113.4, 303/10–12, 114.1, 114.2, 115.4, 115.5, 166, DIG. 3, DIG. 4, 122.09, 122.12, 122.13; 188/358, 359, 345; 60/422, 420, 484, 434, 547.1, 547.2, 548, 547.3, 550–554; 91/434, 451, 460, 371, 431

(56) References Cited

U.S. PATENT DOCUMENTS

| | | | |
|---|---|---|---|
| 3,810,680 | * | 5/1974 | Schenk . |
| 3,967,536 | * | 7/1976 | Bach ........................ 303/10 |
| 3,981,543 | * | 9/1976 | Atkins ...................... 303/10 |
| 4,175,794 | * | 11/1979 | Pauwels . |
| 4,182,536 | * | 1/1980 | Pauwels . |
| 4,492,414 | * | 1/1985 | Kozakai et al. .......... 303/10 |
| 4,779,422 | * | 10/1988 | Brown . |
| 5,310,251 | * | 5/1994 | Towers et al. ........... 303/11 |
| 5,531,509 | * | 7/1996 | Kellner et al. ........... 303/114.1 |
| 5,549,361 | * | 8/1996 | Sorensen .................. 303/3 |
| 5,983,637 | * | 11/1999 | Lubbers et al. . |
| 6,007,160 | * | 12/1999 | Lubbers et al. .......... 303/114.1 |
| 6,038,857 | * | 3/2000 | Towers et al. . |
| 6,142,584 | * | 11/2000 | Towers et al. .......... 303/114.1 |
| 6,149,248 | * | 11/2000 | Lubbers et al. .......... 188/358 |

\* cited by examiner

*Primary Examiner*—Douglas C. Butler
(74) *Attorney, Agent, or Firm*—Leo H. McCormick, Jr.; Warren Comstock

(57) ABSTRACT

A hydraulic brake system wherein a portion of a volume of a first fluid supplied to a steering system by a pump is selectively diverted to an actuator assembly for a master cylinder to develop an force for actuating a master cylinder to pressurize fluid which is supplied to wheel brakes. An electronic control unit (ECU) for the brake system receives a first input signal indicative of the flow of fluid from the pump in the steering system, a second input signal indicative of the input force applied by the operator and a third input signal indicative of the speed of the wheels of the vehicle for developing a pulse modulated operational signal. The electronic control develops an operational signal which is supplied as the pulse modulated operational signal to a magnetic responsive valve. The pulse modulated operational signal creates a variable orifice in the magnetic responsive valve to restrict the flow of the first fluid to the steering gear and increases the fluid pressure of the first fluid. This increase in the fluid pressure of the first fluid is develops an operational force for actuating the master cylinder to effect a brake application. The electronic control unit supplies the pulse modulated operational signal to the magnetic responsive valve until a desired braking of the vehicle is achieved.

12 Claims, 3 Drawing Sheets

HYDRAULIC BRAKING SYSTEM

This invention relates to a hydraulic braking system for a vehicle wherein operational pressurized fluid is supplied to a remote actuator assembly to operate a master cylinder that pressurizes fluid that is supplied to wheel brakes to effect a brake application. An operator applies an input force to a force sensor, which supplies an electronic control unit with an input signal indicating a desired braking for the vehicle. The electronic control unit develops an operational signal as a function of the input signal, deceleration of the vehicle and the flow of the pressurized fluid of a source. The operational signal is supplied from the electronic control unit to a magnetic responsive valve as a pulse modulated operational signal such the flow of pressurized fluid from the source to a steering gear is restricted to correspondingly increase in the fluid pressure therein to an operational pressure to activate the remote actuation assembly.

BACKGROUND OF THE INVENTION

Hydraulic brake boosters have been designed to provide an assist in the actuation of a master cylinder to pressurize fluid to developed a force to effect a brake application. In order to reduce the cost of a hydraulic brake booster, often the same hydraulic power source used to supply a steering gear is used to power a hydraulic brake booster. The controls for such hydraulic brake boosters are designed such that a minimum amount of hydraulic fluid is always available for operation of either the hydraulic brake booster or the steering gear. In certain brake boosters, of a type disclosed in U.S. Pat. Nos. 3,967,536; 4,131,055; 4,179,980; 4,514,981; 4,724,674 and 5,442,916, the booster operates by restricting flow from one side of a power piston to the other side of the power piston to create a fluid pressure differential which causes the power piston to move and provide power assisted displacement of the pistons in a master cylinder. In this type of brake booster, the master cylinder and booster are joined together and as a result the overall length occupies considerable under hood space of a vehicle. Because of the efficiency of such brake boosters they have found application in many vehicles and in particular van and certain mid-sized trucks. However, in some models of recently manufactured vehicle, the physical design of the under hood space is often restricted or reduced, and as a consequently locating a brake booster and other components is often a difficult task. To better utilize under hood space, it has been disclosed in U S. Pat. Nos. 5,329,769, 5,313,796 and U.S. patent application Ser. No. 09/097,778, now U.S. Pat. No. 6,038,857 that certain brake systems components could be located remotely from under the hood. These brake systems functioning in an adequate manner but require a considerable number of components in the control apparatus to provide a stable and smooth application of the wheel brakes.

U.S. Pat. No. 4,865,399 discloses an anti-lock brake system wherein pressurized fluid developed by a pump system is supplied to wheel brakes to effect a brake application. The time the pressurized fluid is supplied to any individual wheel brake is alternately increased and decreased through the actuation of a solenoid valve by a pulse-width-modulated signal to produce a desired braking deceleration for a vehicle.

SUMMARY OF THE INVENTION

A primary object of the present invention is to provide a hydraulic brake system wherein pressurized fluid is supplied to wheel brakes to effect a brake application in response to braking signals generated through an electronic control unit (ecu) which supplies a magnetic responsive valve with a pulse modulated operational signal to create a variable orifice. The creation of the variable orifice in the magnetic responsive valve restricts the flow of pressurized fluid from a source to a steering gear and increases the fluid pressure of the fluid therein from a source, a portion of the fluid with the increased fluid pressure is thereafter supplied to activate an actuator assembly and operate a master cylinder that produces pressurize fluid that is supplied to wheel brakes to effect a desired brake application.

In more particular detail, in the present invention of a hydraulic brake system for the vehicle, a portion of a volume of a first fluid from a first source supplied to a steering system is selectively diverted to an actuator assembly for a master cylinder as a function of the a braking operational signal developed by an ecu including a pulse width modulation signal for operating a magnetic responsive valve in the fluid circuit of the steering system. The ecu for the hydraulic brake system develops the operational braking signal from various inputs including a first input signal indicative of the flow of the first fluid in the steering circuit, a second input signal indicative of an input force applied by the operator to a brake pedal and a third input signal indicative of the movement of the wheels of the vehicle. The ecu supplies the pulse modulated operational signal to the magnetic responsive valve to restrict the flow of the first fluid to the steering by creating a variable orifice in the magnetic responsive valve. Restriction of the flow of the first fluid to the steering circuit causes an increase in the fluid pressure of the first fluid. This increase in the fluid pressure of the first fluid is communicated to the actuator assembly to develop an operational force in a second fluid that is supplied to wheel brakes to effect a brake application in response to an operator input force applied to a input member. The ecu continues to supplies a pulse modulated operational signal to the magnetic responsive valve until a desired rate of braking occurs in the vehicle corresponding to the operator input as indicated by the second input signal. In the absence of the first signal, the ecu supplies a back-up pump with an actuation signal which supplies the actuator assembly with a secondary pressurized fluid to create an operational force to effect a brake application. In the absence of the first signal and actuation of the back-up pump, the input assembly acts through a reaction assembly to pressurized fluid which is supplied to the wheel brakes to effect a brake application.

An advantage of this hydraulic brake system of this invention resides in the actuation of a magnetic responsive valve by a pulse modulated operational signal developed by an ecu as a function of an input force from an operator, motion or movement of a vehicle and fluid pressure developed by the restriction of flow through a variable orifice to produce an actuation force.

A further advantage of this brake system of this invention is by providing by a hydraulic brake system with a primarily braking circuit through the activation of a pulse modulated magnetic responsive valve to create a first operational force for a master as a function of an operator input force, movement of the vehicle, and the availability of fluid pressure from a first source, secondarily braking circuit through the activated by an electric pump to create a second operational force as a function of an operator input force, movement of the vehicle and fluid pressure developed in a fluid by the electric pump and a manual or back up circuit through wherein fluid pressure is developed by the operator input moving a piston in a reaction assembly to provide pressurized fluid to effect a brake application.

BRIEF DESCRIPTION OF THE DRAWINGS

FIG. 5 is a graph illustrating the operation of the brake system of FIG. 1 through the operation of the magnetic valve of FIG. 2.

DETAILED DESCRIPTION

Figure 1:
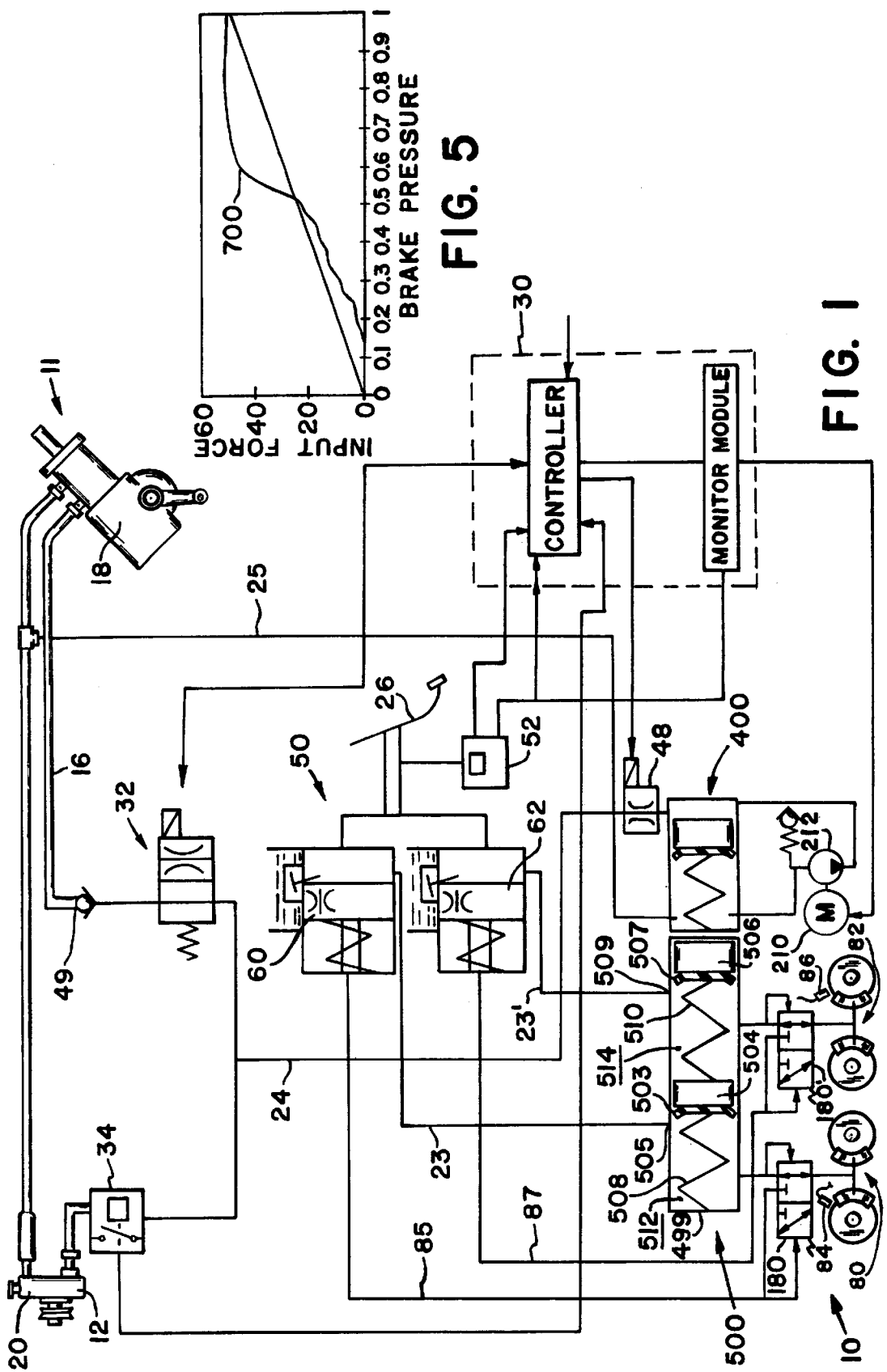
FIG. 1 is a schematic illustration of a hydraulic brake system according to the present invention having a primarily mode of operation through actuation of a magnetic valve by a pulse modulated signal developed by an electronic control unit, a secondary mode of operation through the operation of an electric pump developed by the electronic control unit and a back-up mode of operation through manually moving a piston by an operator input to develop pressurized fluid to effect a brake application.

The brake system 10 shown in FIG. 1 is a schematic illustration of the present invention and includes a first or primary source of pressurized fluid which is developed in a pump 12 for use in a steering system 11, a second or secondary source of pressurized fluid which is developed by electric motor 210 connected to a pump 212 for use in the brake system 10 and a back-up source of pressurized fluid which is developed through movement of pistons 60,62 in a reaction mechanism 50 by a manual input applied to brake pedal 26 to effect a brake application. The selected source of pressurized fluid is dependent on a plurality of inputs supplied to ecu 30 which develops an operational brake signal to either activate a magnetic responsive valve 32 located in conduit 16 or electric motor 210 connected to pump 212. In the absence of inputs supplied to the ecu 30, the manually activated development of pressurizing fluid by brake pedal 26 moving pistons 60,62 is always available to effect a brake application.

When a vehicle is operating, pump 12 is continually circulating fluid through conduit 16 to steering gear 18 and back to a reservoir 20. A flow switch 34 located in conduit 16 provides ecu 30 with a first signal that indicates that the first source of pressurizing fluid is flowing in conduit 16.

Figure 2:
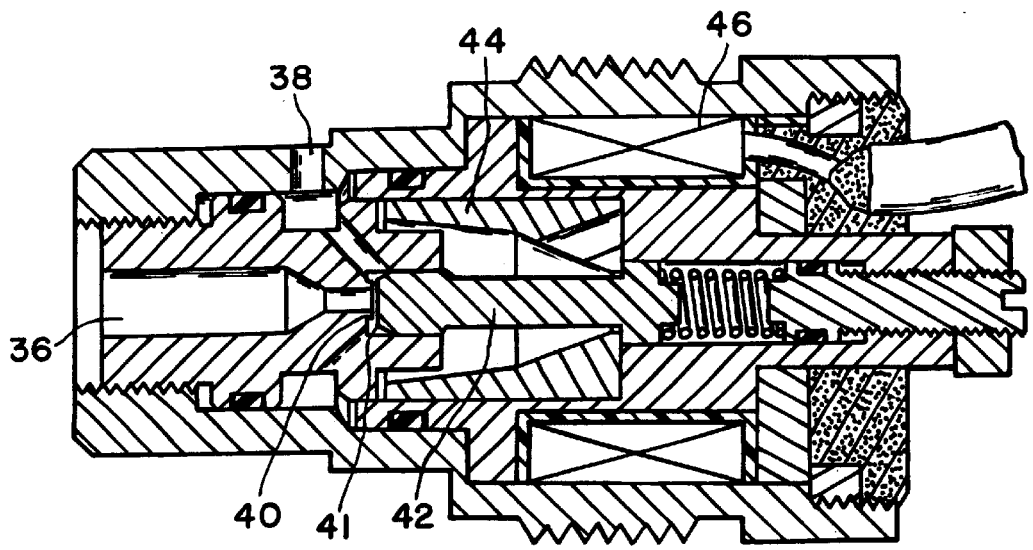
FIG. 2 is a sectional view of a magnetic valve for use in the hydraulic brake system illustrated in FIG. 1.
Figure 3:
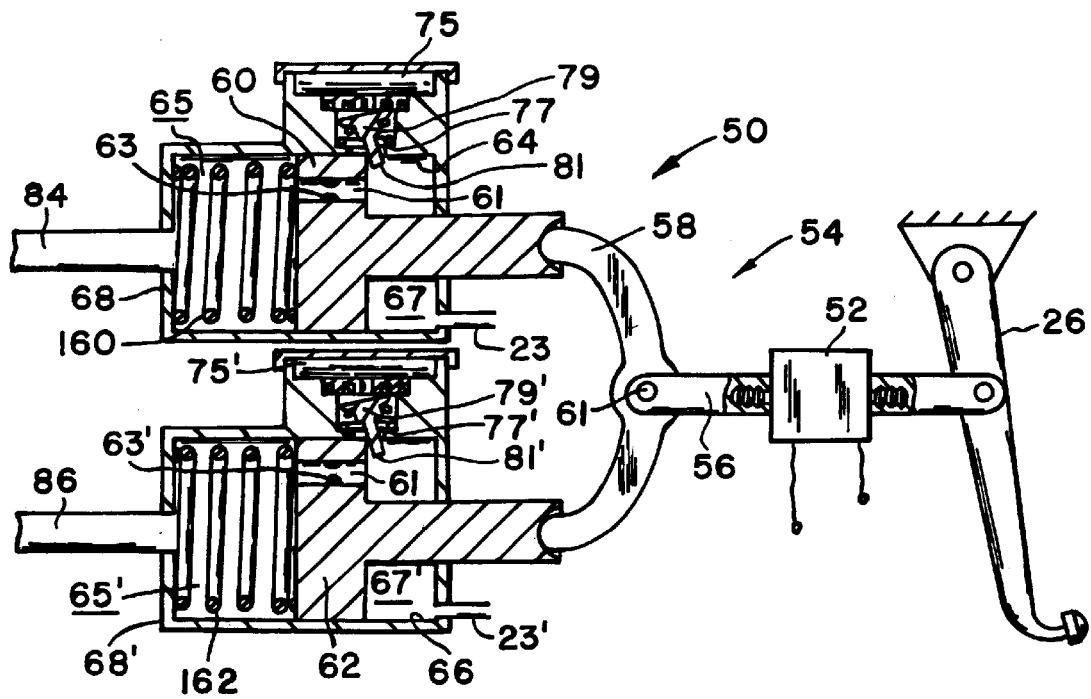
FIG. 3 is a sectional view of a reaction assembly and linkage-force sensor associated with a brake pedal for use in the hydraulic brake system illustrated in FIG. 1.
Figure 4:
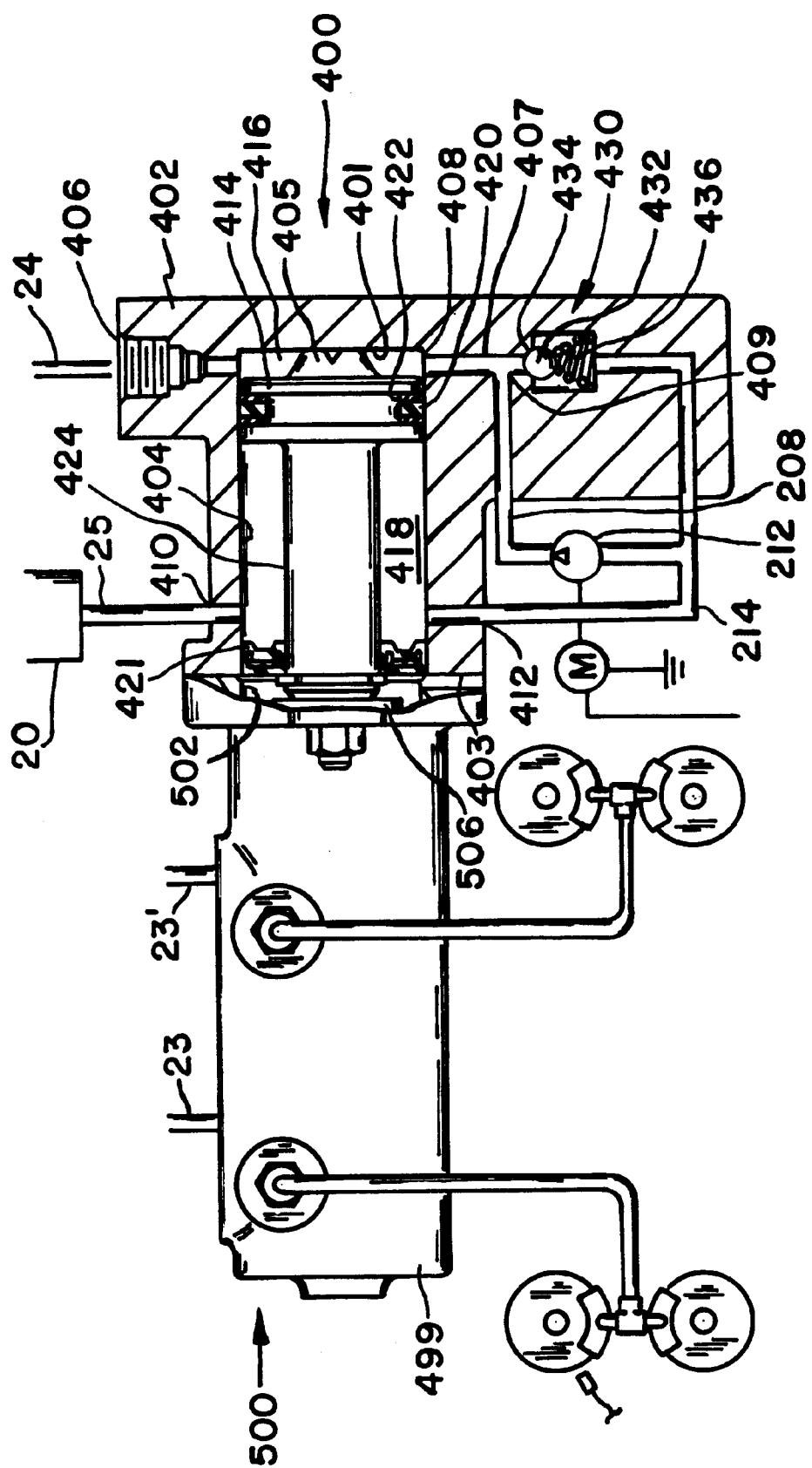
FIG. 4 is a partial sectional view of an actuator assembly and master cylinder for use in the hydraulic brake system illustrated in FIG. 1.

A magnetic responsive solenoid valve 32 of a type disclosed n U.S. Pat. No. 4,765,587 and illustrated in FIG. 2 is located in conduit 16. Valve 32 has an inlet port 36 separated from an outlet port 38 by an annular seat 40 and an adjustable plunger or poppet assembly 42 connected with armature 44 which responds to the electrical energy or current supplied to coil 46. Coil 46 is connected to receive an operating signal from the ecu 30. Coil 46 is normally inactivated such that fluid freely flows through valve 32 from pump 12 to steering gear 18.

A check valve 49 is located in conduit 16 down steam from the solenoid valve 32 such that when the steering gear 18 is operated, any change in the pressure of the fluid during the operation of the steering gear 18 is not communicated through conduit 24 which connects conduit 16 to the actuator assembly 400 of the brake system 10.

The brake system 10 is responsive to input applied to brake pedal 26. Pedal 26 is connected by linkage 54 to a reaction assembly 50. The linkage 54 includes an adjustable push rod 56 that is connected to a central pivot pin 61 on arm 58. Arm 58 provides a linear input for moving pistons 60 and 62 respectively located in bores 64 and 66 of housings 68,68' of the reaction assembly 50. Piston 60 separates bore 64 into a reaction chamber 65 and a reservoir chamber 67 while piston 62 separates bore 66 into a reaction chamber 65' and reservoir chamber 67'. Piston 60 has a passage 61 with an orifice 63 located therein to connected reaction chamber 65 with reservoir chamber 67 while piston 62 has a passage 61' with an orifice 63' located therein to connected reaction chamber 65' with reservoir chamber 67'. Housing 68 includes a first reservoir 75 which is connected to reservoir chamber 67 through first compensation port 77 while housing 68' includes a second reservoir 75' which is connected to reservoir chamber 67' through a second compensation port 77'. Communication between reservoir 75 and reservoir chamber 67 is controlled by a first tilt valve 79 which is located in the first compensation port 77. Similarly, communication between reservoir 75' and reservoir chamber 67' is controlled by a second tilt valve 79' which located in the second compensation port 77'. In the rest position as shown, piston 60 engages stem 81 of tilt valve 79 to provide a flow path from reservoir 75 to a first chamber 512 in master cylinder 500 by way of conduit 23 while piston 62 engages stem 81' of tilt valve 79' to provide a flow path from reservoir 75' to a second chamber 514 in master cylinder 500 by conduit 23'. Linkage 54 also includes a force sensor 52, which receives any input force applied to pedal 26. Force sensor 52 supplies ecu 30 with a signal indicative of the force associated with the desired braking application.

Piston 60 and piston 62 are identical with reaction chamber 65 being connected by conduit 85 to a first set of wheel brakes 80 and reaction chamber 65' being connected by conduit 87 to a second set of wheel brakes 82 in the brake system 10. Communication between chamber 65 and the first set of wheel brakes 80 is controlled by a first shuttle valve 180 while communication between chamber 65' and the second set of wheel brakes is controlled by a second shuttle valve 180'.

The first shuttle valve 180 which is located in conduit 85 between the master cylinder 500 and the first set of wheel brakes 80 directs fluid to and from chamber 65 of the reaction assembly 50 as a function of operating conditions present in the brake system at any particular time. The first shuttle valve 180 components of which are not shown includes a piston which is positioned in a bore by a spring such that fluid is freely communicated between chamber 512 of the master cylinder 500, the first set of wheel brakes 80 and chamber 65 in a rest position, as illustrated in FIG. 1 and when pressurized fluid is developed in chamber 512 through movement of piston 504 to effect a brake application. Shuttle valve 180 is designed to operate and prevent communication to chamber 512 of the master cylinder 500 when the fluid pressure in chamber 65 is greater than the pressure of the fluid in chamber 512. In this condition, the piston moves against spring to close communication between the bore therein and direct the fluid pressure from chamber 65 to operated the first set of wheel brakes 80.

A second shuttle valve 180' is located in conduit 87 between the master cylinder 500 and the second set of wheel brakes 82 to direct fluid to and from chamber 65' of the reaction assembly 50 as a function of operating conditions present in the brake system at any particular time. The second shuttle valve 180' in identical to the first shuttle valve 180 and also includes a piston which is positioned in a bore by a spring such that fluid is freely communicated between chamber 514 of the master cylinder 500, the second set of wheel brakes 82 and chamber 65' in a rest position as illustrated in FIG. 1 and when pressurized fluid is developed in chamber 514 through movement of piston 506 to effect a brake application. Shuttle valve 180' is designed to operate and to prevent communication to chamber 514 of the master cylinder 500 when the fluid pressure in chamber 65' is greater than the pressure of the fluid in chamber 514. In this condition, piston moves against spring to close communication between bore therein and chamber 514 such that the fluid pressure is directed from chamber 65' to operated the second set of wheel brakes 82.

The first and second set of wheel brakes 80 and 82 each have wheel speed sensors 84,86 which function to provide the ecu 30 with a signal indicative of the speed or rotative movement of an individual wheel of the vehicle at any given period of time. The wheel speed sensors 84,86 are generally associated with an anti-lock brake function for a vehicle but in this brake system the output is used to provide an indication of the speed and/or rate of deceleration of an individual wheel during a brake application.

The master cylinder 500 for brake system 10 is remotely located with respect to brake pedal 26 and is operated by an input force supplied by actuator assembly 400. The actuation of the actuator assembly 400 by achieved by a change in the fluid pressure of the fluid supplied by pump 12 to the steering system 11. Actuator assembly 400 has a housing 402 with a bore 404 therein. Bore 404 has a first port 406 connected to supply conduit 16 of pump 12 by conduit 24, a second port 408 connected to an outlet of pump 212 by passage 407 to conduit 208, a third port 410 connected to reservoir 20 by return conduit 25 and a fourth port 412 connected by conduit 214 to an inlet of pump 212. A piston 414 separates the interior of bore 404 into an actuation chamber 416 and a reservoir chamber 418. Seal 420 located in groove 422 of piston 414 prevents communication from actuation chamber 416 to reservoir chamber 418 while bearing seal 421 surrounding shaft 424 of piston 414 prevents communication of fluid from reservoir chamber 418 to bore 502 associated with master cylinder 500. It being understood that steering fluid associated with pump 12 has different properties than the brake fluid associated with the brake system 10 and it is desirable to prevent mixture of such fluids. In order to assure such mixture is avoided, a passage 403 is provided in housing 402 to allow communication of fluid to the surrounding area rather than into bores 404 and 502 should leakage occur through the seals associated with actuator assembly 400 or master cylinder 500.

A check valve 430 associated with the second port 408 is located down stream from the communication tee 409 for conduit 208 of pump 212. Check valve 430 includes a ball 432 that is urged against seat 434 by a spring 436. Spring 436 has a high value and is designed to prevent damage to the actuator assembly 400 should the fluid pressure developed by pump 212 exceed a predetermined valve but will always main seated when fluid pressure is provided to actuator assembly 400 by the pump 12 of the steering system. Check valve 430 is also connected to reservoir 20 by way of conduit 214 of the inlet of pump 212 to define a closed circuit.

Check valve 48 is an off-on solenoid valve and in conduit 24 at a position adjacent inlet port 406. Solenoid valve 48 is designed to receive an operational signal from ecu 30. As long as a first signal is supplied to ecu 30 by switch 34 indicating fluid flow in conduit, solenoid valve remains in the off position, however in the absence of flow in conduit 16, ecu 30 supplies solenoid valve 48 with a signal to move to an on position to block fluid communication from chamber 416 to conduit 24.

The master cylinder 500 is conventional in that first and second pistons 504, 506 are located in bore 502 of housing 499 by spring 508 and 510 to define a first chamber 512 and a second chamber 514. The first chamber 512 is connected to the first wheel brakes 80 and chamber 65 by conduit 85 while the second chamber 514 is connected to the second wheel brakes 82 and chamber 65' by conduit 87. Springs 508 and 510 act on the first piston 504 to urges the second piston 506 into a rest position where the second piston 506 engages and urges piston 414 of the actuator assembly 400 into engagement with housing 402 to define a rest position and size for actuation chamber 416. In the rest position, chamber 512 is also connected reservoir 75 by way of conduit 23 and chamber 67 while chamber 514 is connected to reservoir 75' by way of conduit 23' and chamber 67'. In the rest position, the first and second set of wheel brakes 80 and 82 are also connected to reservoirs 75,75' such that any fluid displaced during a brake application can be replaced on the termination of an input force on brake pedal 26.

Mode of Operation

When an operator desires to effect a brake application an input force is applied to pedal 26. Sensor 52 is responsive to the input force and communicates a corresponding input signal to the ecu 30. If pump 12 is operating, flow switch 34 supplies the ecu 30 with an operational signal indicating that fluid having a predetermined fluid pressure is circulating in the steering system 11 and a portion thereof is available for use in the operation of the brake system 10. Further, wheel speed sensors 84,86 providing the ecu 30 with signals to indicate movement of the vehicle at any given time period. The ecu 30 evaluates various input signals including the input signal from the switch 34 indicating the flow of fluid from pump 12, movement of the vehicle by wheel speed sensors 84,86 and the intensity of the input force on brake pedal 26 as sensed by force sensor 52 to develop a corresponding operational braking signal which includes a pulse width modulation signal for activating coil 46 in solenoid valve 32. The pulse width modulation signal causes armature 44 to oscillate within a magnetic field developed in coil 46. Plunger 42 is connected to armature 44 and as a result face 41 moves toward and away from seat 40 to define a variable orifice which restricts the flow of fluid between the inlet port 36 and outlet port 38 to cause a resulting increase in the fluid pressure at the inlet port 36. This increase in fluid pressure is freely communicated to actuation chamber 416 of actuator assembly 400 by way of conduit 24 since off-on valve 440 is in an off state in the absence of a signal from the ecu 30. The fluid pressure presented to chamber 416 acts on piston 414 and provides an operational force which moves pistons 506,504 within the master cylinder 500 to produce pressurized fluid which is supplied to the first 80 and second 82 set of wheel brakes to effect a brake application.

The pressurized fluid developed in master cylinder 500 is simultaneously supplied to the wheel brakes 80,82 and reaction chambers 65,65' of the reaction assembly 50. The pressurized fluid acts on pistons 60 and 62 to oppose the input force applied by the operator to push rod 56 by brake pedal 26. The pressurized fluid acts on pistons 60 and 62 to develop a reaction force which eventually nullifies the input force applied to brake pedal 26 to initiate a brake application. The reaction force is received by sensor 52 and continually up dates the input signal communicated to the ecu 30 such that a pulse width modulation signal supplied to coil 46 of solenoid valve 32 is continually changed to reflect the current braking operation. When the desired rate of braking of the vehicle is achieved, as indicated by sensor 52, the pulse width modulation signal from the ecu 30 to coil 46 is terminated and plunger 42 returns to a rest position to allow free flow from the inlet port 36 to the outlet port 38 of valve 32.

FIG. 5 illustrates a trace 700 produced in the development of a brake application using the above-described structural components. As can be seen braking is achieved in a uniform and smooth manner to bring a vehicle to a stop.

When the fluid pressure in conduit 24 returns to the fluid pressure of pump 12, return springs 508 and 510 act on and move pistons 504 and 506 to a rest position as defined by the engagement of face 405 on piston 414 with wall 401 of housing 402 as piston 506 forms a solid link with shaft 424 of piston 414. As cup seal 503 on piston 504 moves past port 505 and cup seal 507 on piston 506 moves past port 509 of housing 499, compensatory fluid present in reservoirs 75,75' is available, if necessary, for insertion in the brake system 10 by way of conduits 23,23'.

If the ecu 30 receives an input signal from force sensor 52 indicating a desired a brake application but no input signal is presented from flow switch 34, the ecu develops a secondary braking signal based on inputs from force sensor 52 and the wheel speed sensors 84,86. This secondary braking signal includes a first signal that is initially sent to on-off switch 48 to activate and move a plunger of a solenoid to interrupt flow communication from conduit 24 to port 406 and a second signal which is thereafter supplied to activates motor 210 connected to pump 212. Pump 212 draws fluid from reservoir 20 by way of conduit 25, chamber 418 and conduit 214 and supplies conduit 208 with pressurized fluid which is communicated to chamber 416 by way of passage 407 connected to inlet port 408. This pressurized fluid acts on piston 414 to provide a force which moves pistons 504 and 506 in master cylinder to pressurized fluid which is supplied to the wheel brakes to effect a brake application. This pressurized fluid is communicated through conduits 85,87 to reaction chambers 65,65' to act on pistons 60 and 62 and oppose the input force applied to sensor 52 by brake pedal 26. The sensor 52 communicates a current input signal to the ecu 30 which modifies the secondary operational signal to motor 210 and either continues to operated motor 210 or terminates the operation thereof depending on a desired rate of braking of the vehicle. When the desired braking is achieved, the input signal from sensor 52 to the ecu 30 terminates and the ecu 30 correspondingly terminates the secondary operational signal to motor 210 and to check valve 48 to open communication between chamber 416 and reservoir 20 by way conduit 25. As the fluid pressure in chamber 416 decreases to the pressure of the fluid in reservoir 20, return springs 508 and 510 in the master cylinder 500 act on pistons 504 and 506 to move to a rest position as defined by the engagement of face 405 on piston 414 with wall 401 of housing 402. As cup seal 503 on piston 504 moves past port 505 and cup seal 507 on piston 506 moves past port 509 of housing 499, compensatory fluid present in reservoirs 75,75' is available through conduits 23,23', if necessary, to add fluid to the brake system 10.

If an operator desires to make a brake application and neither an input signal from relay switch 34 nor a force signal from sensor 52 is supplied to the ecu 30, a manual brake application is achieved in the following manner. The input force applied to brake pedal 26, after overcoming return springs 160, 162, respectively moves pistons 60 and 62 in bores 64 and 66 to close tilt valves 79,79' from reservoirs 75,75' to chambers 67,67. Thereafter, further movement of pistons 60, 62 pressurizes fluid in reaction chambers 65,65' which after passing through shuttle valves 180,180' is directly supplied the first set of wheel brakes 80 and second set of wheel brakes 82 to effect a brake application. While the level of the fluid pressure manually developed is less than through the actuation of either solenoid valve 32 in the primary circuit or pump 212 in the secondary circuit by the ecu 30, it does provide an emergency braking for a vehicle.

We claim:

1. A hydraulic brake system for a vehicle wherein a portion of a first fluid supplied to a steering system by a first source is selectively diverted to an actuator assembly for a master cylinder to develop an operational force for a second fluid that is supplied to wheel brakes to effect a brake application in response to an operator input force applied to a input member, said hydraulic brake system being characterized by control means which receives a first input signal indicative of the flow of said first fluid from said first source, a second input signal indicative of an input force applied by an operator to effect a desired brake application and a third input signal indicative of the speed of the wheels of said vehicle for developing a an operational signal including a pulse modulated operational signal which is supplied to a magnetic responsive valve through which said first fluid is continuously flowing to a gear in said steering system, said magnetic responsive valve responding to said pulse modulated operational signal by creating a variable orifice between an inlet port and an outlet port to restrict the flow of said first fluid to said gear and increase the fluid pressure of said first fluid, said increase in the fluid pressure of said first fluid being communicated to said actuator assembly to develop said operational force for effecting a brake application, said control means continuing to supply said magnetic responsive valve with a pulse modulated operational signal until braking of the vehicle corresponds to said input force applied by the operator.

2. The hydraulic brake system as recited in claim 1 wherein said hydraulic brake system is further characterized by reaction means which receives an operational signal indicative of the fluid pressure of said second fluid to create a reaction force, said reaction force opposing said input force to provide an operator with an indication of the braking force being supplied to said wheel brakes.

3. The brake system as recited in claim 2 wherein said reaction means is characterized by piston means located in a bore of a housing to define an operational chamber and a reservoir chamber, spring means for urging said piston means toward said reservoir chamber, linkage means for connecting said piston means with said input means, said operational signal acting on said piston to create said reaction force to oppose said input force applied to said input means to provide a smooth rate of brake application for said vehicle.

4. The brake system as recited in claim 3 wherein said piston means is characterized by a passage means therein for connecting said operational chamber to said reservoir chamber to modify the effect of said operational signal on said input force.

5. The brake system as recited in claim 4 wherein said reaction means is further characterized by sensor means connected to said input means for developing said second signal as a function of the input force and reaction force.

6. The brake system as recited in claim 3 wherein said input force acts on and moves said piston means to said bore in the absence of said first signal to develop a first backup source of pressurized fluid which is communicated to operate said wheel brakes and effect a brake application as a function of said input force.

7. The brake system as recited in claim 3 wherein said reaction means is further characterized by a reservoir connected to said reservoir chamber and to said wheel brakes for replenishing fluid to the brake system in the absence of an input applied by an operator to a brake pedal.

8. The brake system as recited in claim 7 wherein said reaction means is further characterized by valve means responsive to movement of said piston in response to said input force for terminating communication between said reservoir and said reservoir chamber to avoid modification of said operational fluid pressure on said piston.

9. The brake system as recited in claim 1 wherein said actuator assembly is characterized by piston means located in a bore of a housing having a first inlet port for receiving said first fluid, said first fluid acting on and moving said piston means in said bore to develop said operational force to pressurize said second fluid and effect said brake application.

10. The brake system as recited in claim 9 wherein said housing of said actuator assembly is further characterized by a second inlet port for receiving a source of pressurized fluid from a pump to develop said operational force for effecting a brake application, said pump being activated by a backup signal generated by said control means in the absence of a first signal indicating fluid pressure available from said first source, said control means continuing to supply said backup signal to said pump until a desired rate of braking of the vehicle corresponds to said input force applied to said input member by said operator.

11. The brake system as recited in claim 10 wherein said actuator assembly is further characterized by switch means connected to said control means and allowing said first fluid pressure to be freely communicated through said first inlet to act on said piston means, said switch means responding to said backup signal generated by said control means to terminate communication of said first fluid pressure through said first inlet port and allow pressurized fluid from said pump to develop said operational force.

12. The brake system as recited in claim 11 wherein said actuator assembly is further characterized by relief means connected to said second inlet port to limit pressurized fluid supplied by said pump to develop said operational force.

* * * * *